(No Model.)

F. F. HEILBORN, Dec'd.
L. A. HEILBORN, Administrator.
FRUIT HOLDER.

No. 559,527. Patented May 5, 1896.

WITNESSES:

INVENTOR
Francis F. Heilborn
BY
Edward S. Beach
ATTORNEY.

UNITED STATES PATENT OFFICE.

FRANCIS F. HEILBORN, OF PLAINVILLE, MASSACHUSETTS; LEOPOLD A. HEILBORN ADMINISTRATOR OF SAID FRANCIS F. HEILBORN, DECEASED.

FRUIT-HOLDER.

SPECIFICATION forming part of Letters Patent No. 559,527, dated May 5, 1896.

Application filed January 23, 1894. Serial No. 497,820. (No model.)

*To all whom it may concern:*

Be it known that I, FRANCIS F. HEILBORN, a subject of the Emperor of Germany, and a resident of Plainville, in the county of Norfolk and State of Massachusetts, have invented a new and useful Fruit-Holder, of which the following is a specification.

In eating oranges and similar fruits with a spoon it is the practice to cut the orange in two and while holding one of the parts in the fingers take out the fluid contents and pulp of the fruit by means of a spoon; and it is the object of my invention to provide a convenient fruit-holder which will fit sections of different-sized fruits and clasp the sides of a fruit-section so as to hold the same firm against the thrust of the spoon, and which is also so constructed that the fruit-juices shall not run upon the cloth or table.

My invention is a holder for oranges or analogous fruit, and comprises a cup-shaped receptacle adapted to receive the orange and a suitable base or support therefor, said receptacle being provided with means which project inwardly from the body thereof for piercing the skin of the orange to prevent rotation thereof within the holder.

My invention also consists, broadly, in the combination of a cupped base with a series of fruit-receiving spring-fingers connected to the base to receive a section of fruit and adapted to be pressed upon by the thumb and fingers to free the fruit-juices.

Figure 1:
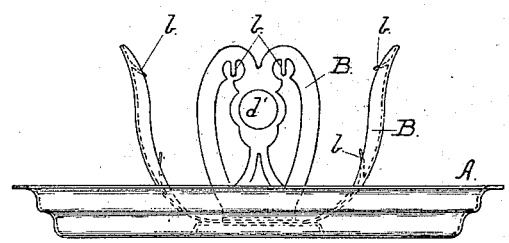
Figure 4:
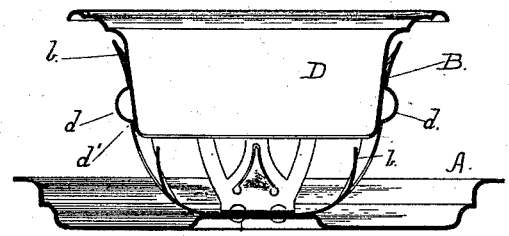
Figure 2:
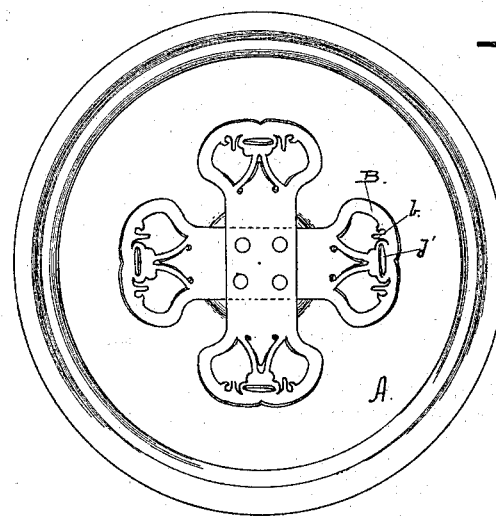
Figure 5:
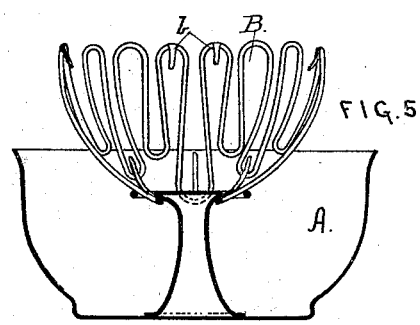
Figure 3:
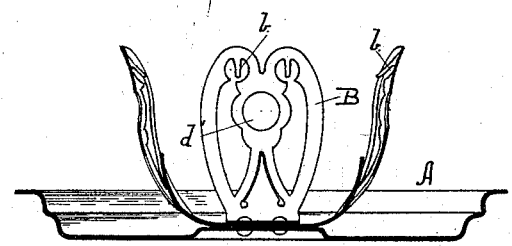
Figure 6:
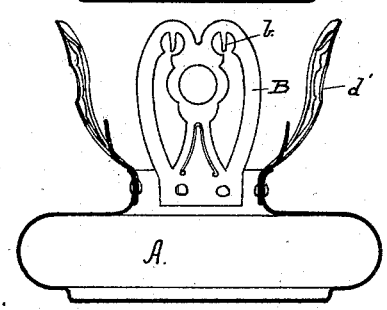

In the accompanying drawings, illustrating the best form of this new article of manufacture now known to me, Figure 1 is a side elevation, Fig. 2 a top plan view, and Fig. 3 a transverse section, of the preferred form of fruit-holder embodying my invention. Fig. 4 is a vertical central sectional view of the fruit-holder combined with a dish to receive the discarded rind or unused portion of the fruit. Fig. 5 is a side elevation of a modified form of the fruit-holder embodying my invention. Fig. 6 shows another modification.

In the drawings, A is the cupped base, preferably in the form of a flanged tray, the function of which is not only to support the fruit-receiving spring-fingers B, but also to receive and retain the juices of the fruit, and so prevent them from running upon the cloth or table. A plurality of spring-fingers B are secured in any desirable way to the base A, preferably by soldering them to the base, and these fingers are so curved as to form a cup-like receiver for a section of the fruit—say the half of an orange—and preferably, although not necessarily, one or more spurs or prongs $b$ are arranged at a proper position within the fruit-receiver to prevent the section of the fruit from slipping out from the grip of the spring-fingers when the spoon is thrust into the fruit. These spurs or prongs are conveniently formed out of portions of the spring-fingers. The spring action of the fingers is not ordinarily sufficient to start the juices in the fruit; but it is intended that they shall be pressed upon by the thumb and fingers of the user, and in that case they serve to guard the fingers from the acids or juices of the fruit-rind.

In the preferred construction some of the prongs $b$ point upwardly, so that they penetrate the rind on the downward thrust of the fruit, while others of the prongs point downwardly to prevent the fruit from moving upwardly when the spoon is thrust downwardly inside the rind; but the downwardly-extended spurs are the more important and in combination with a receiver of any construction form a feature of my invention.

As oranges and various other fruits of the kind ordinarily used in my new fruit-holder are divided into sections, between the partitions of which the pulp and juices are confined, I prefer to combine with the base A a series of spring fruit-receiving fingers arranged in pairs, one member of each pair being opposite the other member, so as to come conveniently between the thumb and finger tips of the user. In this way pressure is more readily and directly exerted upon the pulp-containing compartments of fruit of the nature referred to.

It is particularly desirable to combine with the base A and fruit-receiving spring-fingers connected to it a detachable dish adapted for the reception of the discarded rind or to hold the unused portion of the fruit, and this combination of parts is a feature of my invention, the whole making a unique and useful article of manufacture. Preferably I provide the dish D with lugs $d$, which are received in the recesses $d'$ in the spring-fingers. (See Fig. 4.) This is one of several ways of detachably connecting the dish to the spring-fingers.

It will be plain that my combination of a flanged base with fruit-receiving spring-fingers may be embodied in an article composed principally of wire, and I show such a modification in Fig. 5.

It is of course not absolutely essential in all forms of my invention that base A shall be a flanged tray; but it is desirable that the base shall be so constructed as to receive and prevent the fruit-juices from running upon the cloth or table, and in Fig. 6 I show another modification in which the form of the base A is modified.

What I claim as my invention is—

1. A holder for oranges comprising a cup-shaped receptacle adapted to receive an orange, and a suitable base or support therefor, said receptacle being provided with means, substantially as described, projecting inwardly from the body thereof, for piercing the skin of the orange to prevent rotation thereof within the holder, substantially as set forth.

2. A holder for oranges comprising a cup-shaped receptacle composed of a plurality of spring-fingers; and a suitable base or support therefor, said receptacle being provided with means, substantially as described, projecting inwardly from the body thereof, for piercing the skin of the orange to prevent rotation thereof within the holder, substantially as and for the purpose set forth.

FRANCIS F. HEILBORN.

Witnesses:
    EDWARD S. BEACH,
    FRANCIS K. ALLEN.